Figure 1:
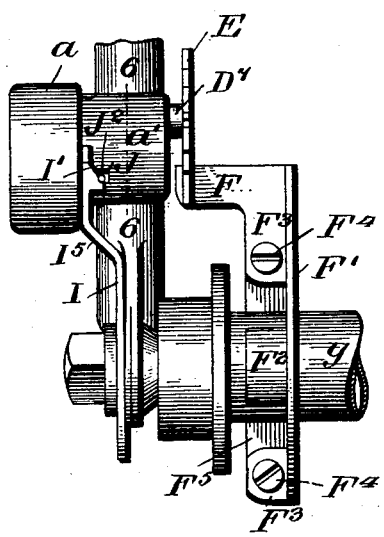

No. 733,817. PATENTED JULY 14, 1903.
J. W. DARLEY, Jr.
SPEED INDICATING MECHANISM.
APPLICATION FILED JUNE 29, 1901.
NO MODEL. 6 SHEETS—SHEET 1.

Witnesses
Geo. F. Byrne
Percy C. Bowen

Inventor
J. W. Darley, Jr.
by Wilkinson & Fisher
Attorneys.

THE NORRIS PETERS CO., PHOTO-LITHO., WASHINGTON, D. C.

No. 733,817. PATENTED JULY 14, 1903.
J. W. DARLEY, Jr.
SPEED INDICATING MECHANISM.
APPLICATION FILED JUNE 29, 1901.
NO MODEL. 6 SHEETS—SHEET 2.
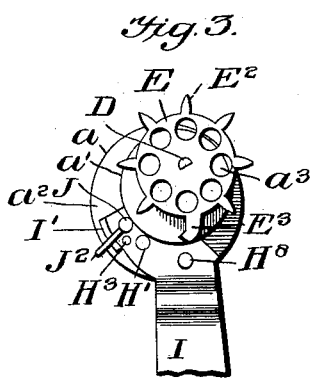
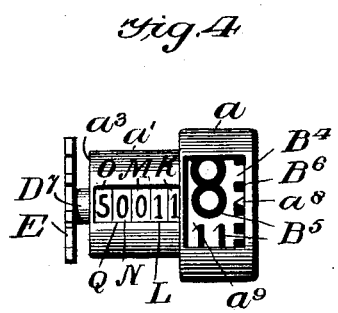
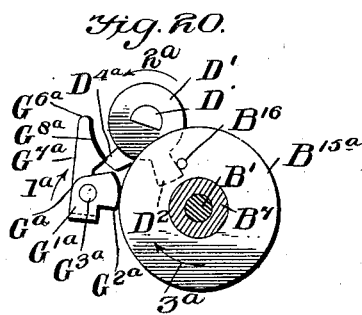
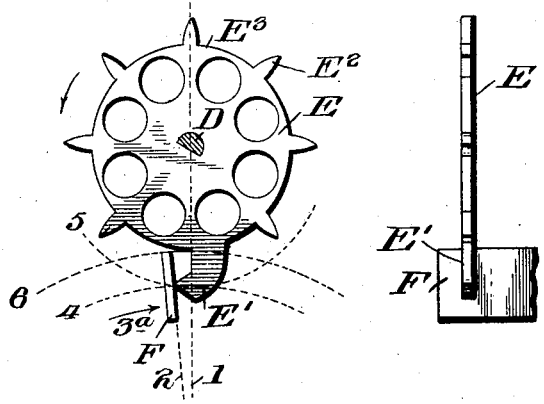
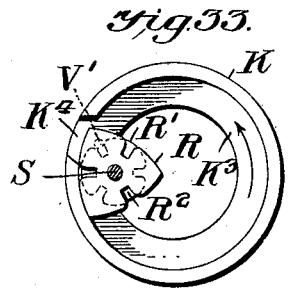
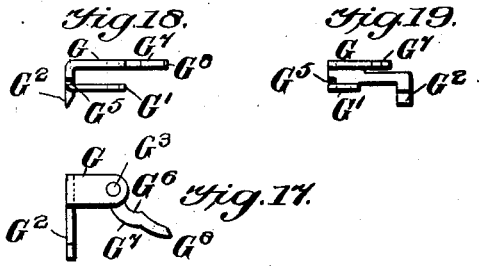
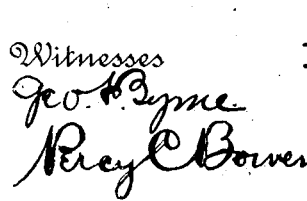
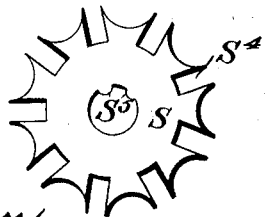
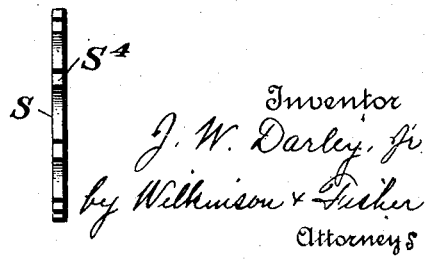

No. 733,817. PATENTED JULY 14, 1903.
J. W. DARLEY, Jr.
SPEED INDICATING MECHANISM.
APPLICATION FILED JUNE 29, 1901.
NO MODEL. 6 SHEETS—SHEET 3.
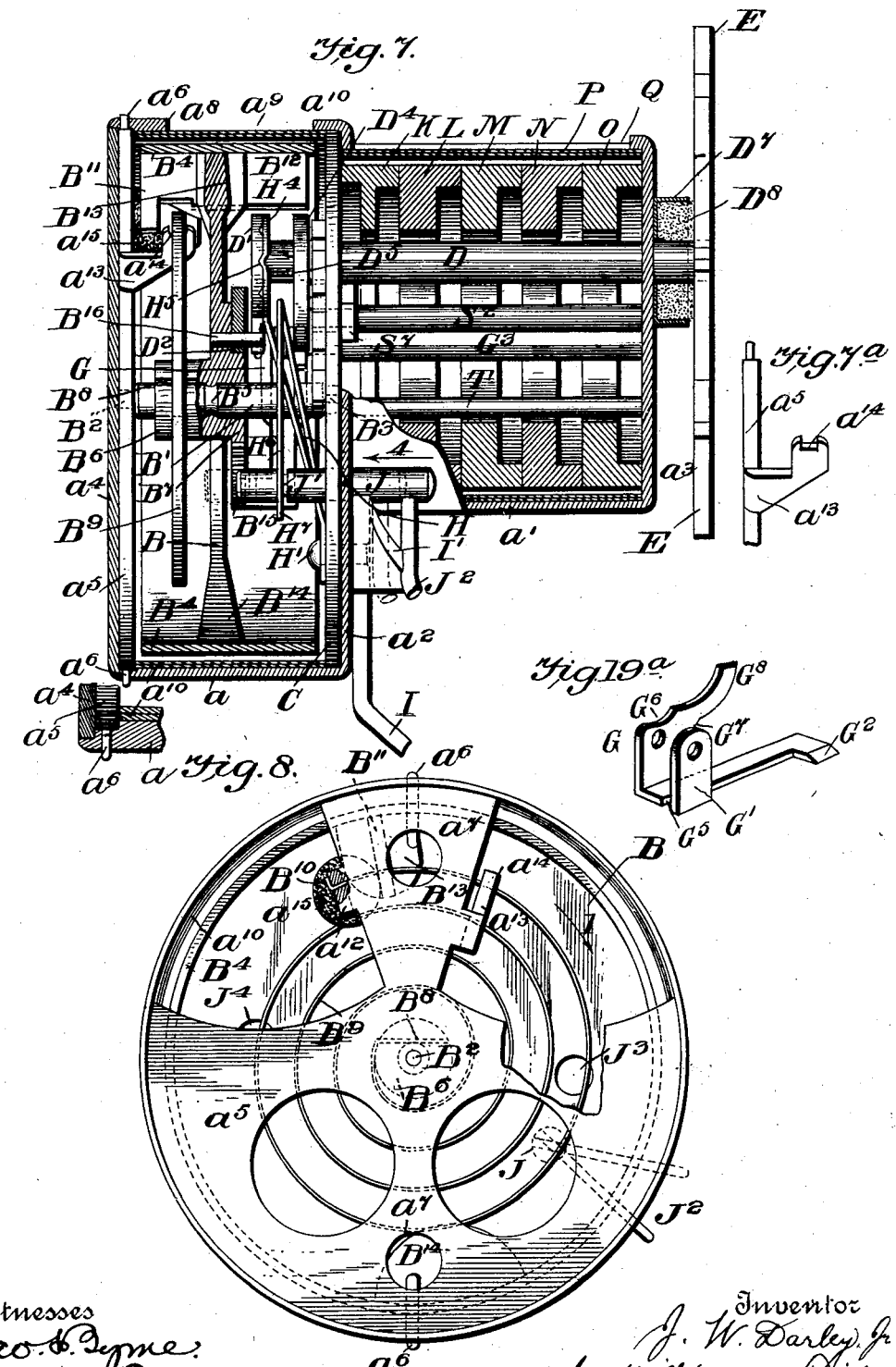

No. 733,817. PATENTED JULY 14, 1903.
J. W. DARLEY, Jr.
SPEED INDICATING MECHANISM.
APPLICATION FILED JUNE 29, 1901.
NO MODEL. 6 SHEETS—SHEET 4.
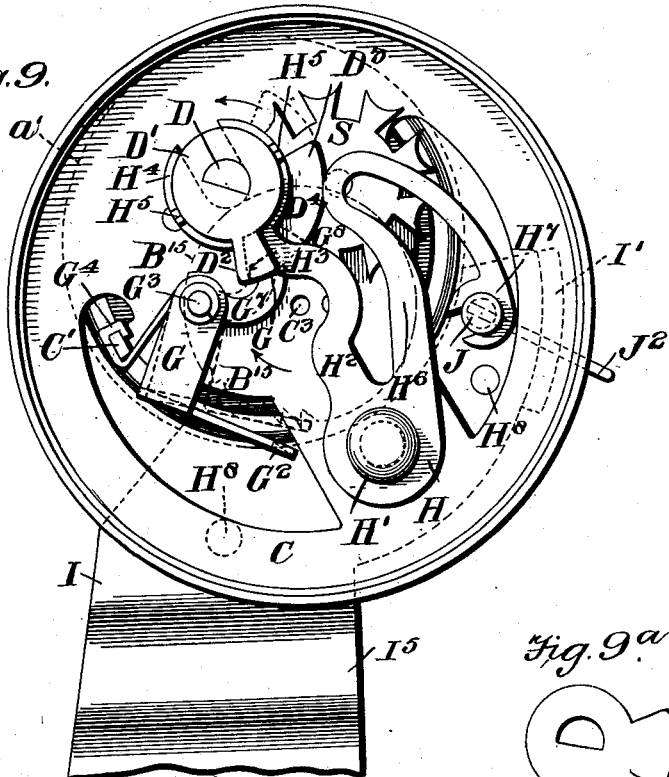
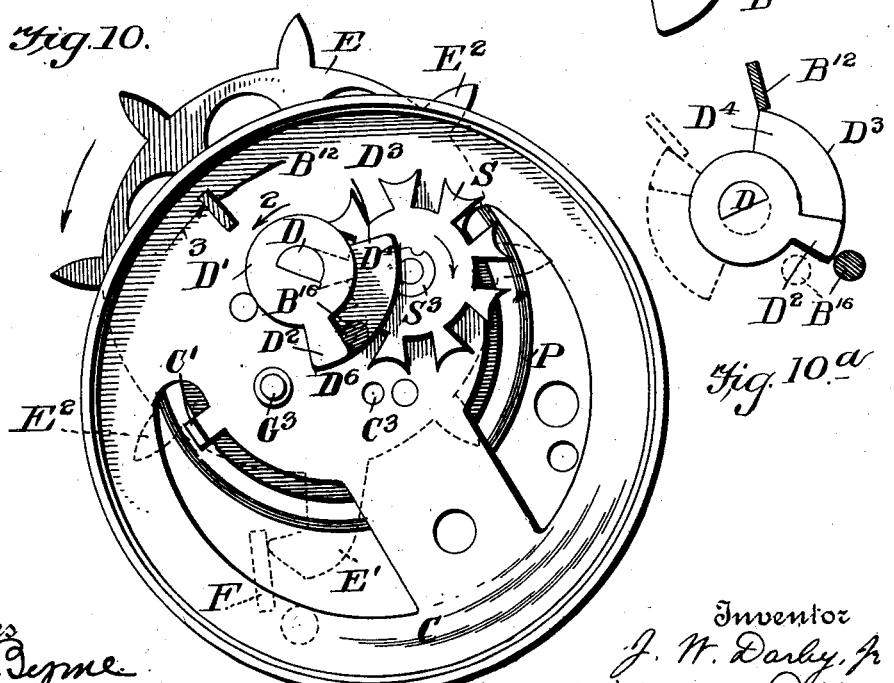

No. 733,817. PATENTED JULY 14, 1903.
J. W. DARLEY, Jr.
SPEED INDICATING MECHANISM.
APPLICATION FILED JUNE 29, 1901.
NO MODEL. 6 SHEETS—SHEET 5.

Witnesses
Geo. P. Dyne
Percy C. Bowen

Inventor
J. W. Darley, Jr.
by Wilkinson & Fisher
Attorneys

No. 733,817. PATENTED JULY 14, 1903.
J. W. DARLEY, Jr.
SPEED INDICATING MECHANISM.
APPLICATION FILED JUNE 29, 1901.
NO MODEL. 6 SHEETS—SHEET 6.
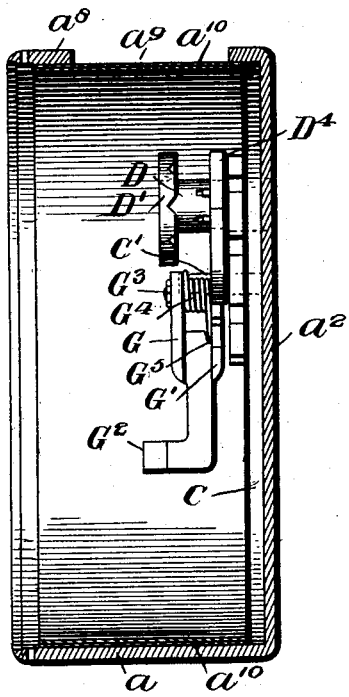
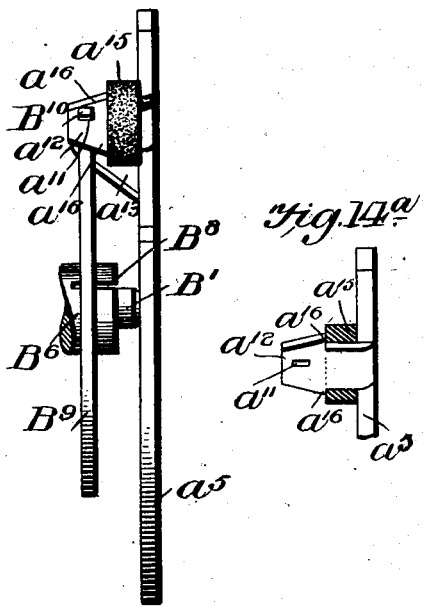
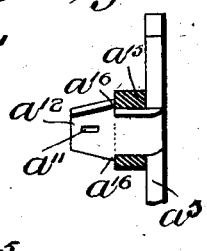
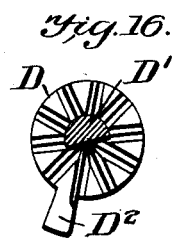
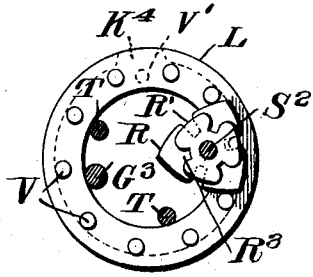
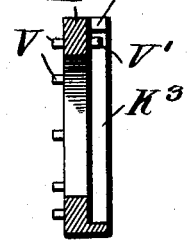
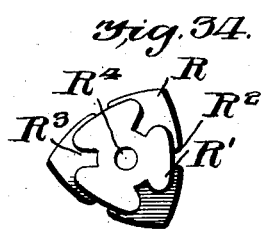
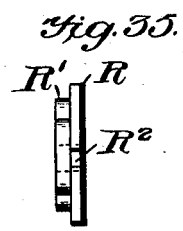
Witnesses
Geo. V. Byrne
Percy C. Bowen
Inventor
J. W. Darley, Jr.
by Wilkinson & Fisher
Attorneys No. 733,817. Patented July 14, 1903.

UNITED STATES PATENT OFFICE.

JOHN W. DARLEY, JR., OF BALTIMORE, MARYLAND.

SPEED-INDICATING MECHANISM.

SPECIFICATION forming part of Letters Patent No. 733,817, dated July 14, 1903.

Original application filed May 1, 1901, Serial No. 58,315. Divided and this application filed June 29, 1901. Serial No. 66,539. (No model.)

*To all whom it may concern:*

Be it known that I, JOHN WESLEY DARLEY, Jr., a citizen of the United States, residing at Baltimore city, in the State of Maryland, have invented certain new and useful Improvements in Speed-Indicating Mechanism; and I do hereby declare the following to be a full, clear, and exact description of the invention, such as will enable others skilled in the art to which it appertains to make and use the same.

My invention relates to improvements in speed-indicating mechanism, this application being a division of my former application filed May 1, 1901, Serial No. 58,315.

I have shown in the drawings a speed-indicating mechanism combined with a distance-measuring mechanism, for the reason that both of these mechanisms are so closely related that it is impossible to show the one without the other.

The object of my invention is to produce a speed-indicator which shall be operated intermittently by a tappet-wheel deriving its impulses from a tappet attached to one of the wheels of a vehicle, for use with which the speed-indicating device shown is primarily intended.

For the purpose of obtaining from the intermittently-operated tappet-wheel indications which shall continue long enough to be covered I support the speed-index for any predetermined number of impulses of the tappet-wheel at the position to which it was driven during the operating impulse of same, the index being free to assume a position approximately proportional to the speed during said impulse. Thus the tappet-wheel receives its impulses from the tappet attached to the moving part. The speed of movement of the tappet-wheel is therefore proportional to the speed of the tappet, and the mechanism by which the tappet-wheel operates the index is such that the movements of the index are approximately proportional to, and hence measure the speed of, the tappet-wheel. The speed-indicating portion of the device is thus broadly differentiated from that class of intermittently-operated speed-indicators in which the movements of the index are proportional to or are derived from a measurement of the interval of time between the impulses of the operating part, for which function the latter class of speed-indicators require some internal device moving at a predetermined speed, the necessity for which is avoided in my device with a great gain in simplicity.

Figure 2:
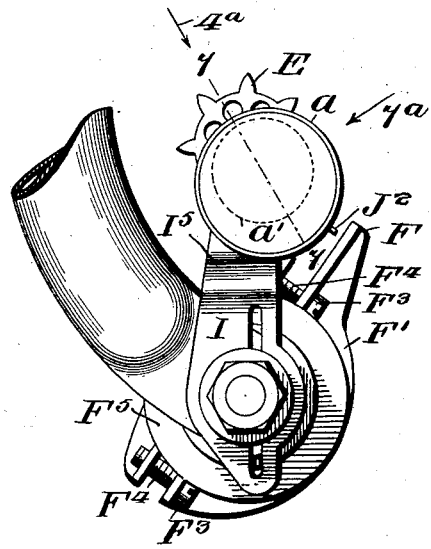
Figure 5:
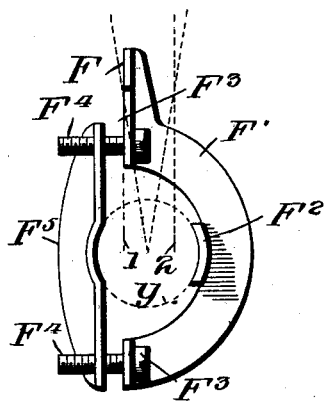
Figure 6:
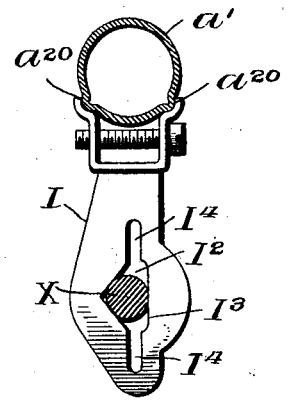
Figure 27:
Figure 28:
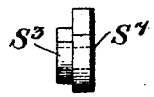
Figure 29:
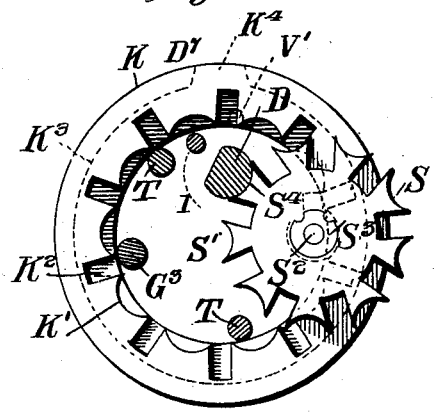
Figure 30:
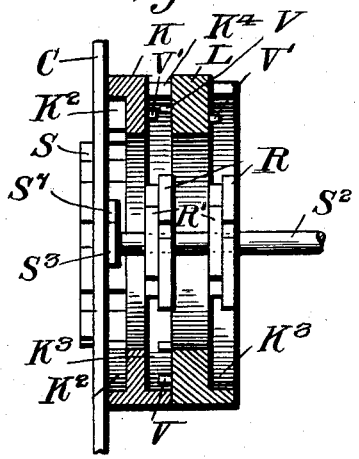
Figure 11:
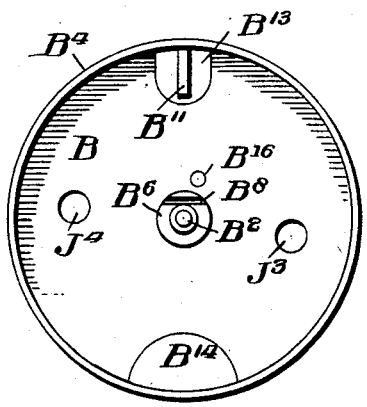
Figure 13:
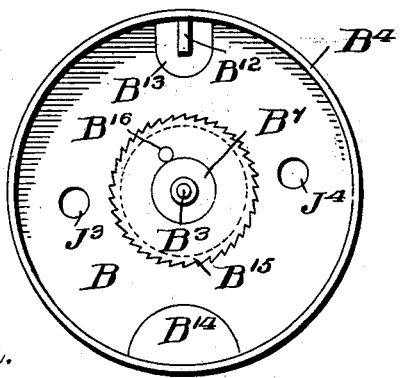
Figure 12:
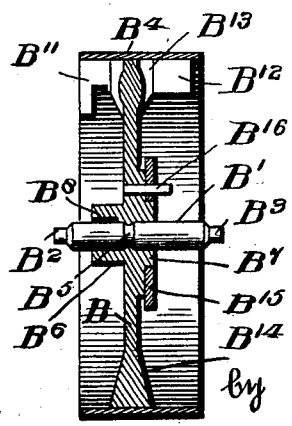

Referring to the accompanying drawings, Figure 1 is a full-size side view of the device in place on the right-hand side of a bicycle, the parts being shown as they would appear to an observer standing in front of a bicycle and looking toward the rear of same. Fig. 2 is a front end view of the device in place looking at the bicycle at the side. Fig. 3 is a side view of the device, part of the supporting-bracket being omitted. Fig. 4 is a top view of the device looking in the direction of the arrow $4^a$ in Fig. 2. Fig. 5 is a view of the tappet by which the device is operated. Fig. 6 shows a form of supporting-bracket which may be used in place of that shown in Fig. 1, a portion of the case of the device being shown as in section along the line 6 6 of Fig. 1. Fig. 7 is an enlarged section along the line 7 7 of Fig. 2 looking in the direction of the arrow $7^a$. For greater clearness the lobed wheels R R' and the pins V V' in the numeral-wheel are omitted. Fig. $7^a$ is a side view of the frame $a^5$. Fig. 8 is an enlarged front view of the device, the cover $a^4$ being removed. Fig. 9 is an enlarged front view of the device, the front cover, front frame $a^5$, and speed-index wheel B being removed. Fig. $9^a$ is a perspective view of the cam $D^4$. Fig. 10 is an enlarged view similar to Fig. 9, except that a few more internal parts have been removed and that the tappet-wheel and tappet are illustrated. Fig. $10^a$ is a diagrammatic view showing the relative movement of the cam $D^4$ and related parts. Figs. 11, 12, and 13 are respectively enlarged front, sectional, and rear views of the speed-index wheel. Fig. 14 is an enlarged side view of the front frame $a^5$, a portion of the speed-index wheel, and the spring therefor. Fig. $14^a$ is a perspective view of the spring fastening-lug. Fig. 15 is an enlarged section similar to Fig. 7, except that the front frame $a^5$, index-wheel, and a few of the smaller parts have been removed. Fig. 16 is an enlarged rear view of the cam by which motion is communicated from the tappet-wheel to the speed-index wheel. Figs. 17, 18, and 19 are respectively front, top, and side views of the ratchet-pawl. Fig. 19$^a$ is a perspective view of the ratchet-pawl. Fig. 20 is a front view of a pawl that can be used in place of the pawl shown in Figs. 17, 18, and 19 with the parts needed to render the same operative. Figs. 21 and 22 are front and side views, respectively, of the tappet-wheel by which the device is operated. Figs. 23 and 24 are respectively front and side views of the split ring by which the pawl, shown in Fig. 17, is retained in place, said ring being sprung into a groove on the end of the pin G$^3$ and next to said pawl. Figs. 25 and 26 are respectively front and side views of the first intermittent gear in the train of wheels of the distance-measuring portion of the device. Figs. 27 and 28 are respectively front and side views of one toothed pinion which transmits motion from the gear shown in Fig. 25 to the first of the numeral-wheels of the distance-measuring portion of the device. Fig. 29 is a front view of the first numeral-wheel of the distance-measuring portion of the device, showing the pins by which said wheels are supported, the intermittent gear, and the devices by which it is operated. Fig. 30 is a vertical section through the first numeral-wheel, shown in Fig. 29, the second numeral-wheel being also shown in section. Figs. 31 and 32 are respectively front and vertical views of the second numeral-wheel. Fig. 33 is a rear view of the first numeral-wheel. Figs. 34 and 35 are front and side views, respectively, of one of the intermittent gears which transmits motion from one numeral-wheel to the next higher.

$a$ and $a'$ represent the two cylindrical portions of the case, which are formed integrally with the flat portion $a^2$ and the end $a^3$. The front end of the cylindrical portion $a$ is closed with a sheet-metal cap $a^4$, which is sprung into a tapering counterbore, as shown in Fig. 7. Just inside of the tapering counterbore is a parallel counterbore, in which fits tightly the frame $a^5$, which is prevented from turning or moving toward the front by the two pins $a^6$ $a^6$, which are driven through the cylindrical portion $a$ of the case and holes provided in the frame $a^5$, the said pins being long enough to extend almost to the center of the holes $a^7$, so that the said pins $a^6$ $a^6$ may be forced out in case the frame $a^5$ is to be removed.

In the center of the frame $a^5$ is journaled one end B$^2$ of the pintle B$'$ of the balance-wheel B. The other end B$^3$ of the pintle B$'$ revolves in a hole C$^3$, provided in the frame C, which fits tightly against the inside of the flat portion $a^2$. (See Figs. 7 and 9 to 13, inclusive.) The cylindrical portion of the balance-wheel B consists of a short length B$^4$ of very thin tubing, upon the outer cylindrical surface of which are the numerals B$^5$, which serve to indicate the speed in miles per hour, the numerals being placed at the proper position to indicate each third mile, beginning at six miles per hour in the present instance and ending at twenty-four miles per hour, the position to indicate each mile between six and twenty-four miles per hour being indicated by the square dots B$^6$, which reference to Fig. 4 will show pass immediately under the index-point $a^8$, formed integrally with the cylindrical portion $a$ of the case. It will be noted that the square dots are made one-half of the space for each mile. Hence if the center of the square dot is under the index-point the even mile is indicated. If the edge of the dot were under the index $a^8$, it would indicate one-fourth mile more or less than the even mile, depending upon the edge that was under the index. When the center of the white space between the dots is under the index, it would indicate one-half mile more than the next lower square dot. Thus in Fig. 4 there is indicated a speed of eight three-fourths miles per hour. I am thus enabled to provide indications of fractional variations of speed which are readily discernible by a person in the saddle of a bicycle or seat of a vehicle. The divisions may be made to read "Minutes per mile," or any other calibration may be employed. The figures and square dots are visible through the window $a^9$, provided in the cylindrical portion $a$. This window is closed with a transparent piece of celluloid $a^{10}$. The tube B$^4$ fits tightly upon the disk-like portions of the balance-wheel B, which is preferably made of type-metal and cast upon the pintle B$'$, in which is provided a groove B$^5$ to prevent lateral displacement of the cast-metal portion. This disk-like casting is formed integrally with two cylindrical extensions B$^6$ and B$^7$, the front one B$^6$ of which has a slot B$^8$ formed therein, in which is clipped one end of the spring B$^9$, the other end of which passes through the hole $a^{11}$, formed in the inwardly-extending lug $a^{12}$ of the frame $a^5$, Fig. 14. After passing through the hole $a^{11}$ the end of the spring is bent at right angles, as at B$^{10}$, and the spring is thus kept in permanent attachment with the lug $a^{12}$. In order to retain the spring B$^9$ in proper shape when the wheel B is moved from its position of rest, a second inwardly-extending lug $a^{13}$ is formed on the frame $a^5$, in the shallow slot $a^{14}$ of which the spring B$^9$ rests, the tension of which is contrary to the arrow 1 in Fig. 8. The spring B$^9$ holds the stop B$^{11}$ of the wheel B against the rubber cushion $a^{15}$ during the periods when the wheel is not indicating speed. The cushion $a^{15}$ is merely a piece of rubber tubing slipped over the lug $a^{12}$ and prevented from coming off by the lateral extensions $a^{16}$ $a^{16}$, Fig. 14$^a$, of said lug. The stop B$^{11}$ is formed of sheet metal, and the disk-like part of the balance-wheel is molded around it, the said stop and pintle B$'$ being introduced in the mold before the metal is poured out. The stop B$^{11}$ is formed with an inward extension B$^{12}$ for a purpose to be hereinafter explained. The thickened portion B$^{13}$ is formed around the stop $B^{11}$ in order to hold it more securely, and in order to balance the weight of the portion $B^{13}$ and stop $B^{11}$ a thickened portion $B^{14}$ of approximately equal weight is formed diametrically opposite to said stop $B^{11}$.

Upon the cylindrical extension $B^7$ of the balance-wheel casting there is mounted the ratchet-wheel $B^{15}$, which is retained in place and prevented from turning by the pin $B^{16}$. It will be noticed that the wheel B is concentric with the portion $a$ of the case.

The frame C has a hole therein which forms an inside bearing for the operating-shaft D, which carries at its inner end the cam $D'$, which has the extension $D^2$, adapted to communicate motion to the balance-wheel B through the pin $B^{16}$. On the outer end of the shaft D is mounted the tappet-wheel E of eight teeth, seven of which, as $E^2$, (see Fig. 21,) are disposed forty-five degrees apart around the periphery. The eighth, $E'$, has its working face brought almost to a knife-edge, which is slightly forward of the position midway between the two adjacent teeth. By reference to Figs. 10 and 21 it will be seen that when the balance-wheel B is in the position of rest, as is shown in Fig. 8, the cam-finger $D^2$ commences to drive the pin $B^{16}$ only when the approaching side of the said finger is on the line passing through the center of the pintle-hole $C^3$ and the operating-shaft D. By this means and the proper sizing of the finger $D^2$ it will only drive the pin $B^{16}$ during a portion of the tooth $E'$, (see Fig. 21,) and the parts are so arranged that the portion of the motion of the tooth $E'$ during which the finger $D^2$ is driving the pin $B^{16}$ is approximately evenly divided by the line 1 in Fig. 21 which passes through the center of the operating-shaft D and the center of revolution of the tappet F. This movement of the tooth $E'$ while the finger $D^2$ is driving the pin $B^{16}$ will hereinafter be called its "indicating" movement, and it is evident that if this movement did not take place close to the line joining the centers above stated there would be slight inaccuracies introduced if the tappet F did not conform to the radial line 2, for it is evident that the slippage of the tooth $E'$ on the tappet F is a function of the divergence of the circles 4 and 5, and if the indicating movement took place when the tooth $E'$ was greatly distant from the line 1 this slippage would amount to considerable and would introduce slight inaccuracies were the tappet F not exactly placed. The circular portions $E^3$ of the tappet-wheel are provided, so that the outer portion of the tappet F may be set so as to just clear it, as indicated by the circle 6. By this means the correct setting of the parts is insured. Now when the wheel carrying the tappet has revolved until it has brought the tappet to the position shown in Fig. 21 it communicates motion to the balance-wheel B in the direction of the arrow 1 in Fig. 8, the speed of which will be directly proportional to the speed of the tappet. The balance-wheel then moves until its rotation is stopped by the resistance of the spring $B^9$. In order to prevent the balance-wheel B from returning to the position of rest, a pawl is provided formed of the parallel sides G and $G'$, which are united by an end piece which extends laterally to form the single pawl-toe $G^2$. Holes are provided in the sides G and $G'$, which form a bearing for the pawl on the pin $G^3$. A spring $G^4$ serves to keep the toe $G^2$ lightly against the ratchet-wheel $B^{15}$, said spring being placed around the pin $G^3$ between the sides G and $G'$ and having one of its ends bearing in the depression $G^5$ of the pawl, the other end of the spring being fastened to the lug $C'$ of the plate C. Hence it will be seen that the balance-wheel will be caught at the point of its greatest movement and prevented from returning, and the proper indication for the speed at which the vehicle was running when the tappet struck the tooth $E'$ will continue to show through the window $a^9$. When the vehicle-wheel has made four revolutions, not counting the revolution during which the teeth $E'$ are moved, it being understood that there is but one tappet F used on the wheel of the vehicle, the tappet-wheel E (see Fig. 1) will be revolved in a counter-clockwise direction until the tooth marked $E^2$ is in position to be next struck by the tappet F. At this time the edge $D^3$ of the cam $D^4$ will be just clear of the edge $G^6$ of the arm $G^7$ of the pawl G. The fifth revolution of the vehicle-wheel causes the tappet F to strike the tooth $E^2$, and this brings the edge $D^3$ of the cam against the edge $G^6$ of the arm of the pawl, and the toe $G^2$ is forced from engagement with the ratchet-wheel $B^{15}$, when the spring $B^9$ returns the wheel B to zero. The sixth and seventh revolutions of the vehicle-wheel merely move the tappet-wheel forward by the two teeth between the teeth $E'$ and $E^2$, thus bringing the tappet-wheel into a position slightly removed in a direction contrary to arrow 1 from that shown in Fig. 10. In this position the cam-finger $D^2$ will be just clear of the pin $B^{16}$ and the circular portion of the cam $D^4$ will still be holding the pawl-toe $G^2$ from contact with the ratchet-wheel $B^{15}$. The eighth revolution will cause the cam-finger $D^2$ to drive the pin $B^{16}$, as before explained, until slightly after the edge of the cam $D^4$, opposite the edge $D^3$, has passed off the edge $G^8$ of the pawl-finger $G^7$, thus allowing the pawl-toe $G^2$ to come into engagement with the ratchet-wheel $B^{15}$ before it has ceased to be positively driven in order to be ready to hold same from returning after the balance-wheel has reached the highest point of its movement, the same cycle of operations being continuously repeated, the extent of movement of the balance-wheel B bearing a relation to the speed of the vehicle.

It will be noted that the indication for any speed is exposed for five revolutions of the vehicle-wheel and that the balance-wheel is released by the pawl, so that it is free to return to its position of rest or zero and remain there for three revolutions. I find that for the higher speeds an interval of rest equivalent to three revolutions of the vehicle-wheel is desirable, as the balance-wheel has then ceased its vibrations by the time the next impulse is communicated to it. The interval of rest may be more or less than three revolutions of the vehicle-wheel, and there may be any number of teeth in the tappet-wheel E, the internal parts being proportioned to suit.

If desired, the ratchet-wheel may be replaced by the friction-disk $B^{15a}$ (see Fig. 20) and the pawl by the brake composed of the two sides $G^a$ and $G'^a$, working on a pin $G^{3a}$ and having its curved surface $G^{2a}$ pressed against the disk $B^{15a}$ by a spring similar to $G^4$ and tending to move the arm $G^{7a}$ in the direction of the arrow $1^a$ in Fig. 20. This tension being such as to make the curved surface $G^{2a}$ bear against the edge of the friction-disk $B^{15a}$ it is evident that the said disk is prevented from returning in a direction contrary to the arrow $3^a$. The shaft D is moved in the direction of the arrow $2^a$, can drive the disk $B^{15a}$ in the direction of the arrow $3^a$, as the curved surface of $G^{2a}$ is so shaped as to permit of rotation in this direction. The shaft D continuing to revolve in the direction of the arrow $2^a$ will bring the cam $D^{4a}$ against the edge $G^{6a}$ of the lever $G^{7a}$, and it will be moved slightly contrary to the arrow $1^a$. This will bring the edge $G^{2a}$ out of contact with the disk $B^{15a}$, and it will be allowed to return toward its position of rest, the edge $G^{2a}$ being held out of contact with and allowed to return to contact with the disk $B^{15a}$ at the same points of the motion of the tappet-wheel E as the pawl-toe $G^2$ terminates and commences its operative relation with the ratchet-wheel $B^{15}$. In Fig. 20 the surface $G^{2a}$ appears to be in contact with the disk $B^{15a}$; but this is owing to the thickness of the lines. In the device the two surfaces would clear when the parts are as shown in said figure. Furthermore, when the device shown in Fig. 20 is employed a cam (not shown) is used which is similar to the cam $D^4$ in Fig. 9 and which is similarly placed with reference to the cam $D^2$, but which is out of line with said cam and the cam-finger $G^{7a}$.

The tappet-wheel E and the cams $D'$ and $D^4$ are pierced with segmental holes which fit on portions of the shaft D, having a flattened portion by which the correct operative relation of the three parts is maintained. The tappet-wheel E and the cam $D'$ are retained in place by riveting over the ends of the shaft D and the cam $D^4$ by striking up suitable projections $D^5$ on the said shaft. (See Fig. 7.) The cam $D^4$ is to be set so as to be in alinement with the arm $G^7$ of the pawl, but clears the pin $B^{16}$, while the cam-finger $D^2$ strikes said pin, but clears the arm $G^7$. When the vehicle is running forward, the cam $D'$ will be turning in the direction of arrow 2 in Fig. 10, and said cam will be driving the balance-wheel in the direction of arrow 3 in said figure, the stop extension $B^{12}$ (shown in section) being so situated with reference to the pin $B^{16}$ that the motion of the balance-wheel will carry said stop extension $B^{12}$ sufficiently far in the direction of the arrow 3 as to clear the edge $D^3$ of the cam $D^4$ as the same continues to move in the direction of the arrow 2, the parts being so arranged that before the cam-finger $D^2$ ceases to drive the pin $B^{16}$ the edge $D^3$ will have moved far enough for the circular portion of the cam $D^4$ to prevent the stop extension $B^{12}$ from returning. When the vehicle runs backward, the motion of the shaft D is reversed, and the cam-finger $D^2$, moving in a direction opposite to the arrow 2, strikes the balance-wheel stop extension $B^{12}$ and moves it in the direction of the arrow 3. When the finger $D^2$ ceases to drive, the stop $B^{12}$ is prevented from returning by the circular portion of the cam $D^4$. The stop $B^{12}$ projects over the cam $D^4$, (see Fig. 7,) which is so arranged that it continues to prevent the said stop extension $B^{12}$ from returning until after the cam-finger $D^2$ has gotten into such a position that the edge $D^6$ of said finger will be slightly to the left of the pin $B^{16}$. The edge $D^6$ has a rounded corner to prevent any possibility of said edge catching the pin $B^{16}$ when the shaft D is moving in an opposite direction to arrow 2. Thus it will be seen that no matter in which direction the shaft D moves the balance-wheel is always moved in the direction of the arrow 3, for by forward motion of the vehicle motion is communicated to the pin $B^{16}$ by the cam-finger $D^2$ and by rearward motion of the vehicle motion is communicated to the stop $B^{12}$ by the cam-finger $D^2$.

The cam $D'$ has V-shaped grooves formed in the side that is placed toward the tappet-wheel, (see Figs. 7, 15, and 16,) and a spring H is provided, which is riveted to frame C by the rivet $H'$, the frame C and the bracket I being also held to the case portion $a^2$ by said rivet. The spring H is formed with a partly circularly shaped portion, having a hole through which passes the rivet $H'$, and the spring has an outward bend where its arm $H^2$ joins the circularly-shaped portion. (See Figs. 7 and 9.) The arm $H^2$ is curved, as at $H^3$, to clear the pintle $B'$ of the wheel B and has a slotted circularly-shaped end $H^4$, the shaft D passing loosely through said slot. On the end $H^4$ are formed two V-shaped projections $H^5$ $H^5$, adapted to bear in the V-shaped grooves of the cam $D'$ under tension of the spring H, which acts in the direction of the arrow 4 in Fig. 7, the object of this construction of spring H and cam $D'$ being to give definite stopping-points for the tappet-wheel E and avoid any faulty action of same with the tappet F. The spring H has another arm $H^6$, (see Figs. 7 and 9,) which extends upwardly and toward the left, makes a U-shaped bend, and returns downwardly and toward the right, terminating in a slotted end H$^7$, which fits loosely in a groove J' of the stop J and tends to move said stop in the direction of the arrow 4 in Fig. 7. The stop J passes loosely through holes in the portion $a^2$ of the case and the bracket I and has near its inside end the lever J$^2$, adapted to bear on the incline I', formed on the bracket I. The object of the stop J is to afford a means of terminating the operation of the speed-indicating portion of the device whenever desirable. As shown in full lines in the drawings, the stop J is in the position to permit of the operation of the speed-indicating portion of the device. When the lever J$^2$ is moved to the position shown dotted in Fig. 8, the spring-arm H$^6$ moves the stop J in the direction of the arrow 4 in Fig. 7 and causes it to bear against the balance-wheel B. If now the balance-wheel B be moved in the direction of the arrow 1 in Fig. 8, the said spring-arm will force the stop J into the hole J$^3$ of the balance-wheel B, when the stop J will occupy the position shown dotted in Fig. 7. When this happens, the balance-wheel B cannot return to its position of rest, and hence no motion can be communicated to said balance-wheel by the cam-finger D$^2$. If this feature is not desired, the parts H$^6$, H$^7$, I', J, and J$^2$ are to be omitted. A light groove is provided in the incline I' for the lever J$^2$ to rest in when it is in the position shown by the full lines.

The shaft D where it passes through the portion $a^3$ of the case passes through the cup D$^7$, containing a felt washer D$^8$, to prevent ingress of dust.

The bracket I is attached to the flat portion $a^2$ of the case by the rivets H' H$^8$ H$^8$ and is provided near its lower end with a triangularly-shaped hole I$^2$, the two oblique sides of which bear against the bolt X of the vehicle-wheel, and thus the distance from the center of said bolt X to the center of the tappet-wheel shaft D remains practically constant when the diameter of said bolt X varies within the limits that occur in practice. Hence the distance from the center of the axle-bolt (see Fig. 6) to the point of the tooth E' of the tappet-wheel is constant, and it follows the speed-indicating portion of the device can be calibrated and sent out with the certainty that its attachment to the vehicle will be correct and that consequently its indications will be exact. The triangularly-shaped hole I$^2$ would be made larger if a larger bolt than X were used, the slots I$^4$ I$^4$ being provided to permit of this enlargement. The bracket I may or may not be bent at I$^5$, as desired. The upper part of Fig. 6 shows a form of clamp to hold the portion $a'$ of the case, which is provided with two ridges $a^{20}$ $a^{20}$ to fit in the clamp of the bracket, and an incline must be formed on the case part $a^3$ to take the place of the incline I' when this form of bracket is used.

The tappet F is formed integrally with a reversed-C-shaped part F', provided with a central longitudinal extension F$^2$, adapted to center same on the hub $y$ of the vehicle. Two lateral extensions F$^3$ F$^3$ are provided, having holes through which loosely pass screws F$^4$ F$^4$, said screws being threaded in the clamp F$^5$. It will be noted that when the tappet is mounted on a hub sufficiently large to move it from the position shown as lying on the dotted line 1 to the position in which it will be on the dotted line 2 the working face of the tappet will make a different angle with the radial line; but between the limits of variation (shown in Fig. 5) no inaccuracy is introduced into the operation of the speed-indicating portion of the device, owing to the relative arrangement of the tooth E' of the tappet-wheel E, the pin B$^{16}$, and the cam D'.

Referring to Fig. 4, the portion of the case $a'$ contains five annular numeral-wheels K L M N O. Of these K registers tenths of miles, and the figures are red, all the figures being black on the other wheels, of which L registers miles, M tens of miles, N hundreds of miles, and O thousands of miles, this the distance-registering portion of the device being capable of registering 9999.9 miles and then repeating. The figures show through a window Q, formed in the case portion $a'$, and are symmetrically disposed with reference to the window A$^9$. The window Q is closed with a transparent piece of celluloid P. (See Fig. 7.) The numeral-wheels are revolubly mounted on the shafts G$^3$ S$^2$ T T between the inside faces of the part $a^3$ of the case and the frame C, one end of the shaft S$^2$ being supported by the part $a^3$ of the case and the other as hereinafter described. Of the four shafts G$^3$ also serves to carry the pawl G, and S$^2$ serves to support the double-lobed wheels R R'. (See Fig. 30.)

The cam D$^4$ has projecting from the side next the frame C the pin D$^7$, as shown in section in Fig. 29, this pin being directly opposite the flat portion of the shaft D.

S represents a locking-wheel, which is mounted on the shaft S$^2$. This wheel is provided with teeth having concaved or inwardly-curved surfaces S$^4$, which teeth are separated from each other. It will be noted that when the parts are as shown in Fig. 29 the wheel S is locked; but if the pin D$^7$ be moved in the direction of the dotted line 1 in Fig. 29 it will enter the slot S', when the flat portion of the shaft D will have turned around sufficiently to unlock the curved surface S$^4$ of the tooth of the wheel S and said wheel will be moved forward one tooth, the curved portion of the shaft D locking the wheel S before the pin D$^7$ leaves the slot S'. Hence the wheel S is moved forward one tooth for each revolution of the tappet-wheel E. The pin D$^7$ is set so that the wheel S is operated after the balance-wheel B is operated.

For communicating motion from the wheel S to the first numeral-wheel K a pinion S$^7$, having a single tooth situated between the two depressions S⁶ in its circular portion, is provided. The pinion is turned to a shoulder, as at S³, and the turned portion passes loosely through a hole in the frame C, and on the projecting end of said turned portion the wheel S is riveted, the projections S⁵ of which fit the grooves S⁶ of the pinion S⁷, and thus relative motion between the said pinion and wheel is prevented. The pinion S⁷ is provided with a central hole S⁸, in which is supported one end of the shaft S², the whole arrangement being shown in Fig. 30. In the face of the wheel K next the frame C is formed an internal intermittent gear, having the circular portions K' and the slots K². The single tooth of the pinion S⁷ operates in the slots K² to move the wheel K forward one tooth for each revolution of the wheel S, and the circular part of the pinion S⁷ acts with the circular parts K' to lock the wheel K except when it is moved by the tooth of the pinion S⁷.

The annular numeral-wheel K, T-shaped in cross-section, is formed with an internal cylindrical recess K³ on the side of said wheel opposite the internal gear. The cylindrical part of the recess is partly cut away, forming a slot K⁴, and opposite this slot K⁴ in the recess K³ is provided the pin V', formed integrally with or driven in the wheel K. In the recess K³ upon the shaft S² (see Fig. 33) is revolubly mounted the lobed wheel, consisting of the two parts R and R'. These two parts may be molded integrally or formed of two punchings sweated together; but in either case they are fast together and bear the relative relation shown in the figures. The outside surface of the part R is partly formed of three intersecting circles, the radii of which are slightly less than the radius of the internal cylindrical part of the recess K³, and these outside surfaces are as if formed with the wheel R R' in place upon the shaft S² and the radii of same applied with the center of the wheel K as a center. Hence it is evident that as the wheel K revolves the wheel R' is locked until the wheel K reaches the position shown in Fig. 33, motion being considered as being in the direction of the arrow 1. The part R is provided with three slots R², in which mesh the pins V of the wheel L, (see Fig. 31,) the outer extremities of the slot being so shaped that in conjunction with the circular portion of the part R they shall drive the pins V of the wheel L with very little lost motion. The part R' is formed with three slots R³, which are placed sixty degrees apart from the slots of the part R, and is otherwise shaped to perform the functions about to be described. When the pin V' reaches the position shown in Fig. 33, it will be in one of the slots R³, and the slot K⁴ will be in such a position that when further motion of pin V' takes place in the direction of the arrow the point of the lobe of the part R, moving in the direction of the arrow, is free to move into said part K⁴, and thus the wheel R R' is free to revolve one tooth. The slots and outer curved surfaces of the part R' are so shaped that it is geared with the pin V' when the part R is unlocked by slot K⁴ in the cylindrical surface of the recess. R⁴ represents the hole by which the wheel R R' is mounted on the pin S². The pin V' is short enough to clear the part R, and the pins V are short enough to clear the part R'. From the foregoing it is evident that the wheel L has a motion equal to the space between two of its pins V for each revolution K. In the same manner the wheel L transmits motion to the wheel M, this to the wheel N, and this to the wheel O.

The wheels L, M, N, and O are each formed with pins V in their sides away from the tappet-wheel E and with recesses K³ in their sides toward said wheel E, the said recesses being cut away, as at K⁴, in all the wheels excepting O and all the wheels having pins V' excepting O.

It is evident that the distance-recording portion of the device will not be damaged if the vehicle runs backward; also, that the distance-recording portion of the device may be built separately, as also the speed-indicating portion, and that both may be used for many purposes besides on vehicles, to application on which I do not wish to confine myself, and that many changes may be made without departing from the spirit of my invention.

The operation of the speed-indicating mechanism is as follows: When the tappet strikes the largest tooth on the tappet-wheel, it throws the speed-indicating balance-wheel B by single swift impulse through a part of a revolution, which part varies with the speed. At the extreme limit of the movement of the wheel B it is caught by the ratchet mechanism described and held stationary for five revolutions of the vehicle-wheel. The indicating-wheel B is then released, which operation is effected by the front edge D³ of the cam D⁴ striking the end G⁸ of the ratchet-pawl G, which operation brings the part D² of the ratchet-pawl G out of engagement with the ratchet-wheel B¹⁵. (See Figs. 9, 12, and 17.) The indicating-wheel B is then returned by the spring back to its position of rest, where it remains until the third revolution thereafter, when it is again driven forward by reason of the tappet striking the tooth E', when the whole cycle of operation is repeated.

Having thus described my invention, what I claim as new, and desire to secure by Letters Patent of the United States, is—

1. In a speed-indicating mechanism, the combination with an indicator provided with means giving it a normal bias toward an initial position sufficient to return the same to this position after each displacement therefrom, of impulse-delivering means for said indicator having a velocity bearing a fixed ratio to, but permitting the continuous motion of, the part the speed of which is to be measured, and constructed to throw the indicator from its initial position beyond the field of movement of said impulse-delivering means by an amount dependent upon such speed, a scale being provided having graduations expressed in units of velocity for indicating the extreme limit of such movement, substantially as described.

2. In a speed-indicating mechanism, the combination with a pivotally-mounted indicator provided with means giving it a normal bias toward an initial position sufficient to return the same to this position after each displacement therefrom, of impulse-delivering means for said indicator having a velocity bearing a fixed ratio to that of the part the speed of which is to be measured and constructed to throw the indicator from its initial position beyond the field of movement of said impulse-delivering means by an amount dependent upon such speed, a scale being provided having graduations expressed in units of velocity for indicating the extreme limit of such movement, substantially as described.

3. In a speed-indicating mechanism, the combination with a pivotally-mounted indicator provided with means giving it a normal bias to an initial position sufficient to return the same to this position after each displacement therefrom, of impulse-delivering means for said indicator having a velocity bearing a fixed ratio to that of the part the speed of which is to be measured and constructed to throw the indicator from its initial position beyond the field of movement of said impulse-indicating means by an amount dependent upon such speed, a scale being provided having graduations expressed in units of velocity for indicating the extreme limit of such movement, and means intermittently active to hold the indicator temporarily stationary at the extreme limit of its movement, substantially as described.

4. In a speed-indicating mechanism, the combination of an indicating-wheel, a spring and means coöperating therewith to periodically return the said wheel to its initial position at all speeds, and means operated from the part the speed of which is to be indicated for intermittently moving said wheel from its initial position against the tension of said spring by a single impulse, whereby the said wheel is moved an amount varying with the speed, substantially as described.

5. In a speed-indicating mechanism, the combination of an indicating-wheel and holding means therefor, a spring and means coöperating therewith to periodically return the said wheel to its initial position at all speeds, and means operated from the part the speed of which is to be indicated for intermittently moving said wheel from its initial position against the tension of said spring by a single impulse, whereby said wheel is moved an amount varying with the speed, substantially as described.

6. In a speed-indicating mechanism, the combination of a casing having an opening or window closed by a transparent material, a wheel provided with indicating-marks on its periphery mounted in said casing, a spring and means coöperating therewith to periodically return the said wheel to its initial position at all speeds, and means operated from the part the speed of which is to be indicated for intermittently moving said wheel against the tension of said spring by a single impulse, whereby the said wheel is moved an amount varying with the speed, substantially as described.

7. In a speed-indicating mechanism, the combination of a casing having an opening or window closed by a transparent material, a wheel provided with indicating-marks on its periphery mounted in said casing and holding means therefor, a spring and means coöperating therewith to periodically return the said wheel to its initial position at all speeds, and means operated from the part the speed of which is to be indicated for intermittently moving said wheel against the tension of said spring by a single impulse, whereby the said wheel is moved an amount varying with the speed, substantially as described.

8. In a speed-indicating mechanism, the combination of a tappet, an indicating-wheel and a spring, the parts being so arranged that the indicating-wheel is periodically moved from its initial position at all speeds against the tension of a spring a distance depending upon the speed of the tappet, substantially as described.

9. In a speed-indicating mechanism, the combination of a shaft provided with a tappet-wheel, a wheel provided with indicating-marks on its periphery, a spring connected to said wheel, means for periodically moving said wheel from its initial position against the tension of said spring a distance depending upon the revolution of said tappet-wheel, and means for holding said indicating-wheel stationary for a time at the extreme limit of its movement, substantially as described.

10. In a speed-indicating mechanism, the combination of an operating-shaft provided with a tappet-wheel, a wheel provided with indicating-marks on its periphery, a spring attached to said wheel, means on said operating-shaft for periodically moving said indicating-wheel against the tension of said spring, by a single swift impulse through spaces depending on the speed, means for holding said wheel for a short time at the extreme limit of its movement, and means for releasing said indicating-wheel thereby allowing the spring to return it to its initial position, substantially as described.

11. In a speed-indicating mechanism, the combination of a casing provided with a cushioned stop, a wheel having indicating-marks on its periphery and provided with a projection adapted to engage said stop, a spring and means coöperating therewith to periodically return the said wheel to its initial position at all speeds, and means operated from the part the speed of which is to be indicated for intermittently moving said wheel from its initial position against the tension of said spring by a single impulse, whereby the said wheel is moved an amount varying with the speed, substantially as described.

12. In a speed-indicating mechanism, the combination of a casing provided with an opening or window closed by a transparent material, and also provided with a cushioned stop, a wheel having indicating-marks on its periphery and provided with a projection adapted to engage said stop, a spring and means coöperating therewith to periodically return the said wheel to its initial position at all speeds, and means operated from the part the speed of which is to be indicated for intermittently moving said wheel from its initial position against the tension of said spring by a single impulse, whereby the said wheel is moved an amount varying with the speed, substantially as described.

13. In a speed-indicating mechanism, the combination of a casing, a skeleton frame provided with a lug carried by said casing and a spring attached to said lug, said skeleton frame being also provided with a notched extension for guiding said spring, substantially as described.

14. In a speed-indicating mechanism, the combination of a casing provided with an opening or window closed by a transparent material, a shaft journaled in said casing, a stop and a lug supported by said casing, a spring connected to said lug and to said shaft, a wheel having indicating-marks on its periphery supported on said shaft and provided with a projection adapted to engage said stop, means for periodically moving said wheel against the tension of said spring, and means including said spring for returning said wheel to its initial position, substantially as described.

15. In a speed-indicating mechanism, the combination of a wheel having indicating-marks on its periphery, a spring attached to said wheel and means for periodically moving said wheel from its initial position against the tension of said spring, no matter whether the vehicle to which said mechanism is attached is running forward or backward, substantially as described.

16. In a speed-indicating mechanism, the combination of a tappet-wheel, a wheel having indicating-marks on its periphery, a spring attached to said wheel, and means for periodically moving said indicating-wheel in the same direction against the tension of said spring by the revolution of said tappet-wheel, no matter whether the vehicle to which said mechanism is attached is running forward or backward, substantially as described.

17. In a speed-indicating mechanism, the combination of a supporting-shaft, a tappet-wheel thereon having a tooth with a lateral projection, and means for causing said shaft to stop in certain definite positions after it has been moved by said tappet-wheel, substantially as described.

18. In a speed-indicating mechanism, the combination of an operating-shaft, a tappet-wheel thereon, a disk fastened to said shaft and provided with V-shaped depressions and a forked spring, the forks of which engage said shaft, said spring being provided with V-shaped projections adapted to engage the depressions on said disk, substantially as described.

In testimony whereof I affix my signature in presence of two witnesses.

JOHN W. DARLEY, Jr.

Witnesses:
J. STEPHEN GIUSTA,
GUSTAVE R. THOMPSON.